Patented Oct. 18, 1932

1,883,443

UNITED STATES PATENT OFFICE

JAN AL, OF AMSTERDAM, NETHERLANDS, ASSIGNOR TO NAAMLOOZE VENNOOTSCHAP DE BATAAFSCHE PETROLEUM MAATSCHAPPIJ, OF THE HAGUE, NETHERLANDS

PROCESS FOR THE MANUFACTURE OF ACETONE

No Drawing. Application filed December 3, 1930, Serial No. 499,855, and in Great Britain December 6, 1929.

It is known that acetone can be obtained by heating isopropyl alcohol in the presence of suitable catalysts, such as copper, which promote the reaction:

$$CH_3CHOHCH_3 = CH_3COCH_3 + H_2$$

According to this invention it has been found that the conversion of isopropyl alcohol into acetone may advantageously be effected by passing the isopropyl alcohol in vapour form, with or without admixture of other gases or vapours, through a liquid medium, which is heated to the desired reaction temperature. As liquid medium, molten lead is preferably used, but other molten metals or alloys or molten metal salts or fused salt mixtures may also be employed. Examples of salt mixtures are equimolecular quantities of barium chloride and calcium chloride and in molecular proportions 80 of calcium fluoride with 20 of calcium chloride or 33 of magnesium chloride with 67 of potassium chloride or 75 of potassium chloride with 25 of calcium chloride or 50 of sodium chloride with 50 of potasium chloride. The liquid medium selected should not appreciably attack the isopropyl alcohol or the aceton, nor should it give rise to or promote undesirable side-reactions, such as the formation of coke or of hydrocarbons.

The process according to the invention has among others the advantage that the isopropyl alcohol to be treated need not be in a pure state, but may be mixed with other gases or vapours, particularly water vapour.

If pure isopropyl alcohol is not available and only more or less concentrated aqueous solutions thereof can be obtained, such solutions according to the present process may be used directly, without previously freeing the same from the water.

The process of this invention may for example be carried into effect by vaporizing isopropyl alcohol or an aqueous isopropyl alcohol solution and conducting the vapours through a heated vessel, in which the liquid medium such as molten lead is contained. The temperature of the liquid medium may vary between wide limits, say from 300°-700° C. A temperature in the neighbourhood of 600° C. gives good results. By suitably regulating the gas velocity an almost complete conversion of the isopropyl alcohol into acetone may be attained.

The outflowing gases are cooled and condensed. As a valuable by-product hydrogen is formed, which may easily be recovered separately. The condensed liquid chiefly contains actone and, if an aqueous solution of isopropyl alcohol is used also condensed water vapour. The gases may contain small amounts of carbon dioxide, carbon monoxide, unsaturated hydrocarbons, methane and/or other hydrocarbons.

The process according to the invention may be operated continuously and may involve the well-known methods to attain the highest possible heat-economy, such as the use of heat-exchangers. Generally speaking it is advisable to prevent the reacting isopropyl alcohol vapours from coming into contact with iron, which gives rise to undesirable side-reactions. The vessel containing the liquid medium should, therefore, preferably be made of or lined with copper or chromium or other non-ferrous metals or with other materials resistant to the action of isopropyl alcohol vapours.

The process is illustrated by the following example.

Vapours containing 88% of isopropyl alcohol and 12% of water are conducted through molten lead contained in a copper-lined vessel, and heated to a temperature of approximately 625° C. The outflowing gases are cooled and a liquid is obtained, containing 82.8% of acetone, i. e. 95.7% of the theoretical yield.

What I claim is:

1. A process for the manufacture of acetone from isopropyl alcohol, wherein isopropyl alcohol in vapour form is caused to pass through a liquid medium heated to a temperature between about 300 and 700° C., which liquid medium at said temperatures does not react to any appreciable extent with the vapours with which it comes into contact.

2. A process for the manufacture of acetone from isopropyl alcohol, wherein isopropyl alcohol in vapour form mixed with water vapour is caused to pass through a liquid medium heated to a temperature between about 300 and 700° C., which liquid medium at said temperature does not react to any appreciable extent with the vapours with which it comes into contact.

3. A process as claimed in claim 2, wherein the isopropyl alcohol vapour containing water vapour is obtained by heating an aqueous solution of isopropyl alcohol.

4. A process as claimed in claim 1, wherein the isopropyl alcohol vapours are mixed with inert gases.

5. A process as claimed in claim 1, wherein the isopropyl alcohol vapours are mixed with gases participating in the reaction.

6. A process as claimed in claim 1, wherein the liquid medium consists of a molten metal.

7. A process as claimed in claim 1, wherein the liquid medium consists of a molten metal alloy.

8. A process as claimed in claim 1, wherein the liquid medium consists of at least one molten metal salt.

In testimony whereof I hereunto affix my signature.

JAN AL.